(12) United States Patent
Pachet

(10) Patent No.: US 8,856,120 B2
(45) Date of Patent: Oct. 7, 2014

(54) METHOD AND APPARATUS FOR UPDATING PROTOTYPES

(75) Inventor: Francois Pachet, Paris (FR)

(73) Assignee: Sony France S.A., Clichy la Garenne (FR)

( * ) Notice: Subject to any disclaimer, the term of this patent is extended or adjusted under 35 U.S.C. 154(b) by 607 days.

(21) Appl. No.: 12/682,705

(22) PCT Filed: Oct. 15, 2008

(86) PCT No.: PCT/EP2008/063822
§ 371 (c)(1),
(2), (4) Date: Jul. 2, 2010

(87) PCT Pub. No.: WO2009/050172
PCT Pub. Date: Apr. 23, 2009

(65) Prior Publication Data
US 2010/0299328 A1  Nov. 25, 2010

(30) Foreign Application Priority Data
Oct. 16, 2007  (EP) .................................... 07301470

(51) Int. Cl.
*G06F 17/30* (2006.01)

(52) U.S. Cl.
CPC ............................... *G06F 17/30038* (2013.01)
USPC ...................................................... 707/736

(58) Field of Classification Search
CPC ............................................... G06F 17/30038
See application file for complete search history.

(56) References Cited

U.S. PATENT DOCUMENTS

| | | | |
|---|---|---|---|
| 7,415,153 B2 * | 8/2008 | Mojsilovic | ..................... 382/162 |
| 7,849,416 B2 * | 12/2010 | Chandhoke et al. | .......... 715/771 |
| 2003/0158828 A1 * | 8/2003 | Ikeda et al. | ..................... 706/12 |
| 2004/0117367 A1 | 6/2004 | Smith et al. | |
| 2006/0004476 A1 * | 1/2006 | Ferren et al. | .................. 700/117 |

FOREIGN PATENT DOCUMENTS

WO    2004 055639    7/2004

OTHER PUBLICATIONS

Bianchi-Berthouze, Nadia et al., "K-DIME: An Adaptive System to Retrieve Images from the WEB Using Subjective Criteria", Databases in Networked Information Systems. International Workshop DNIS 2000. Proceedings (Lecture Notes in Computer Science vol. 1996) pp. 157-172, XP002479728, ISBN: 3-540-41395-2, (2000).

(Continued)

*Primary Examiner* — Dinku Gebresenbet
(74) *Attorney, Agent, or Firm* — Oblon, Spivak, McClelland, Maier & Neustadt, L.L.P.

(57) ABSTRACT

An apparatus and method for machine-updating of prototypes—for example, during design of digital objects, or content-management—has input means (15) for inputting descriptive classifiers (tags) that a user assigns to prototypes and a tag model generator (20) that uses machine learning techniques to produce a model of the association between the assigned tags and the values of quantifiable, non-subjective attributes of the tagged prototypes. In order to obtain a desired updating of a current prototype, the user issues a command which defines the desired variation of the current prototype by referring to one or more conditions that should be met by specified tags of the updated prototype. The prototype-updating apparatus/method has a prototype updater (30) that identifies a suitable updated prototype whose tags meet the condition(s) specified in the user's command and which, globally, is fairly similar to the pre-update prototype. The user can, thus, express instructions for prototype-updating using his own terminology.

12 Claims, 8 Drawing Sheets

(56) References Cited

OTHER PUBLICATIONS

Hayashi, Takashi et al., "An Image Retrieval System to Estimate Impression Words from Images Using a Neural Network", IEEE, vol. 1, pp. 150-155, XP010248901, ISBN: 978-0-7803-4053-4, Oct. 12, 1997.

Rui, Yong et al., "Relevance Feedback: A Power Tool for Interactive Content-Based Image Retrieval", IEEE Transactions on Circuits and Systems for Video Technology, vol. 8, No. 5, pp. 644-655, XP011014499, ISSN: 1051-8215, Sep. 1, 1998.

Kato, Toshikazu et al., "Intelligent Visual Interaction with Image Database Systems Toward the Multimedia Personal Interface", Journal of Information Processing, vol. 14, No. 2, pp. 134-143, XP000406116, (1991).

* cited by examiner

METHOD AND APPARATUS FOR UPDATING PROTOTYPES

FIELD

The present invention relates to the updating of prototypes, by machine, in response to instructions issued by a user. More particularly, the invention relates to methods and apparatus for machine-updating of one or more attributes of a prototype in response to an instruction expressed using ad hoc terminology.

BACKGROUND

There are a wide variety of applications in which a user may wish to modify the properties of a prototype presented to it by a computer or other machine. For example:
- graphic design software packages may allow a user to produce a drawing, a colour, or other image data, by modifying aspects of a prototype drawing, colour, etc;
- music-creation software may allow a user to produce a melody, a chord, a sound, a sound loop, a song, a mix, or other audio data, by modifying aspects of a prototype melody, chord, song, etc;
- in the field of robotics, the commands given to a robot may be generated by modifying one or more parameters of a prototype command-set that represents high-level sensory-motor commands;
- a content-management system for digital content (notably multimedia content: films, video clips, images, songs, etc.) may allow a user to select items of content, notably for rendering, by expressing the selection criteria in terms of a change in properties of a prototype: that is, the new digital content may be selected by comparing its properties with those of another item of content (a prototype), such as the item of content currently being rendered (played back); and so on.

SUMMARY

It will be seen that many of the above applications relate to the design of digital objects or digital content—graphical material, music material, high-level sensory-motor commands. However, the present invention is not limited to use in systems in which one or more aspects of a prototype is varied in order to perform a design function. For example, the last item in the above list relates to an application in which the updating of a prototype serves to select an item of content for some purpose (e.g. for deletion, rental, rendering, copying, etc.) by defining its properties relative to those of the current prototype.

The descriptors that a human being uses to describe an object—be it a digital object, an item of digital content, etc.—are often subjective. The descriptors may be subjective in the sense that they are not directly descriptive of a physical property of the object itself, for example, because they indicate a mood that the object evokes in the user or a value judgement that the user makes in relation to the object (a "happy" colour, an "unfriendly" portrait). The descriptors may also be subjective in the sense that different users will not agree as to the extent to which the same object is well-described by a given descriptor (a colour that is "deep blue" to one person may be "mid blue" for another).

However, when conventional computers and other machines describe prototypes (objects), they are designed to use descriptors ("features") that are not subjective. Typically, a computer program, or application-specific hardware, will define a set of quantifiable, non-subjective attributes that will be possessed by prototypes, and an allowable range of values for those attributes.

When a user wishes to instruct the computer system/machine to update a prototype—e.g. to change to a song having a tempo faster than that of the song that is currently playing, to vary the hue of the currently-displayed colour, etc.—he is constrained to issue instructions that express his desired variation in terms of a change in one (or more) of these quantifiable, non-subjective attributes that have been pre-defined by the manufacturer or programmer of the computer system/machine. This leads to a formalistic and artificial style of control.

Moreover, in many cases, a user may not fully understand what effect he will obtain by varying a particular non-subjective, quantifiable attribute that is recognised by the computer/machine. For example, in the case of a system permitting a user to design a short musical sequence, the system may describe the prototype melodies using features that are only fully understood by an expert musician. If he lacks a deep understanding of the quantifiable non-subjective attributes that the system uses to describe the prototypes, the user may find it difficult, if not impossible, to use the system to manipulate prototypes as he desires.

The present inventors have devised a new approach that enables users to employ their own, freely-chosen terminology to instruct a computer system or other machine to implement the variations they wish to see made to a prototype, without needing to program the machine explicitly to understand the semantic meaning of the user's terminology.

Embodiments of prototype-updating apparatuses and prototype-updating methods according to the present invention, adapted to update a prototype, define a lexicon interactively with a user, through a tagging system, and use machine-learning techniques to find relationships between the expressions that are defined in the lexicon and the values of the non-subjective, quantifiable attributes of the prototypes which the user tags using those expressions.

Databases of digital content often store content in annotated form, that is, associated with descriptive classifiers ("tags"). In general, tags are keywords that describe one or more properties possessed by the item of digital content. In some known systems, users are allowed to tag items of digital content using their own subjective descriptors, and supervised classification techniques are used by the system in order to develop a model representing an association between each tag and one or more non-subjective properties of the tagged items of content. A user may then search for items in the database that possess particular tags. In other words, in known systems where a user assigns subjective tags to objects, those tags are always used as descriptors (either of an already-identified object or of an object to be located).

Prototype-updating apparatus/methods according to the present invention apply the same kinds of supervised classification techniques in order to create a model for each tag in the lexicon. In embodiments of the invention, users can control the updating that is applied to prototypes, by issuing commands which define the desired change in terms of a relationship applicable to one or more tags defined in the lexicon.

In a simple case, the user's instruction may define the desired prototype-update in terms of a desired direction of variation in a single tag. For example, in a colour-creation system, if a user has tagged coloured objects using tags such as "dark", "blue", "red" and "happy", the user might command a change in a currently-displayed colour by issuing an instruction to make the current colour "more happy". The prototype-updating apparatus/method identifies candidate variants of the prototype by consulting the tag "happy" and the operator "more" present in the user's command, and uses the tag model it has developed for the tag "happy" in order to identify prototype variants having attribute values which, according to the tag's model, have a greater probability than the current prototype of belonging to the tag class "happy" (i.e. the updated probability conforms to the operator "more" in the user's command). In a similar way, if the user command had been "less blue", the apparatus/method would use the tag model developed for the tag "blue" in order to identify candidate variants of the prototype that have a lower probability than the current prototype of belonging to the tag class "blue".

When the user's command defines a desired prototype-update in terms of a desired direction of variation in a tag it may also quantify the amount of change the user would like to see. For example, the user's command could indicate that the user wishes to select (e.g. for playback) a song which is twice as "jazzy" as the song currently being played, or that he wishes to make a walking robot's current gait more "rhythmic" by 10%, etc. The prototype-updating apparatus/method uses the tag model developed for the tag specified in the user's command in order to identify one or more prototypes that have a probability of belonging to the specified tag class that differs by the desired amount from the current prototype's probability of belonging to this class.

Prototype-updating systems and methods embodying the present invention can accommodate other user commands besides those which define a prototype-update in terms of a direction of variation of a tag. More generally, the user's instruction may define the desired prototype-update by specifying substantially any relationship that should hold for the tags of the updated prototype. For example, in a fashion-design system, if a current prototype is a dress having a number of white polka dots on a dark blue background, the user might wish to specify that the prototype should be updated so that it is "as dotty as the background is blue"—this amounts to an instruction that the tag "dotty" should be applicable to the updated prototype to the same degree as the tag "blue background" is applicable to the updated prototype. As another example, in the same fashion-design system, the user might issue a prototype-update command indicating that he wishes to make the prototype "more cheerful than it is off-the-shoulder"—this amounts to an instruction that the tag "cheerful" should be applicable to the updated prototype to a greater degree than the tag "off-the-shoulder" is applicable to the updated prototype Furthermore, prototype-updating systems and methods according to the invention can accommodate user commands which specify plural changes in the prototype via a single instruction: for example, a user command could specify that a prototype melody should be updated so as to be "more rhythmic, less percussive, and as jazzy as it is syncopated".

The prototype-updating apparatus/methods according to the present invention enable a user to obtain a desired updating of a prototype that is presented to him in the digital domain, without the need to refer, in his commands, to pre-defined non-subjective attributes of the prototype. Thus, embodiments of the present invention provide computer-aided design apparatus and methods, and content-management apparatus and methods, which can be used with less training than conventional systems, which are intuitive to operate and which do not demand a deep understanding of the quantifiable non-subjective attributes of the prototypes being manipulated.

The present invention relates to methods and apparatus which update a digital prototype: in other words, the updated prototype will still have an overall (or global) similarity to the version prior to the update. Thus, embodiments of prototype-updating apparatus/method according to the present invention seek to identify updated prototypes which, except for the desired variation identified in the user's command, are "similar" to the current prototype. Accordingly, embodiments of the invention include a step or means which assesses the global similarity between a current prototype and a candidate to be the updated prototype, and a candidate prototype which this means or step finds to be globally similar to the current prototype is selected as the updated prototype. This feature enables the user to work in an intuitive manner more and more closely towards a final digital object (or item of digital content) which he finds pleasing. For example, in a melody-creation system, a user who has requested the updating of a current melody—a tune in the key of C minor—to one which is "more melancholy", is liable to be happier if the updated prototype is another melody in C minor (more melancholy than the first), rather than if it is a "more melancholy" melody in a completely different key, because the updated prototype is likely to be closer to what he had in mind for the finished melody.

According to the present invention, user-assigned tags are not merely used as descriptors but become tools for manipulating/transforming a prototype.

BRIEF DESCRIPTION OF THE DRAWINGS

The above and other features and advantages of the present invention will become apparent from the following description of certain embodiments thereof, given by way of example, in association with the accompanying drawings, in which.

DETAILED DESCRIPTION

Figure 1:
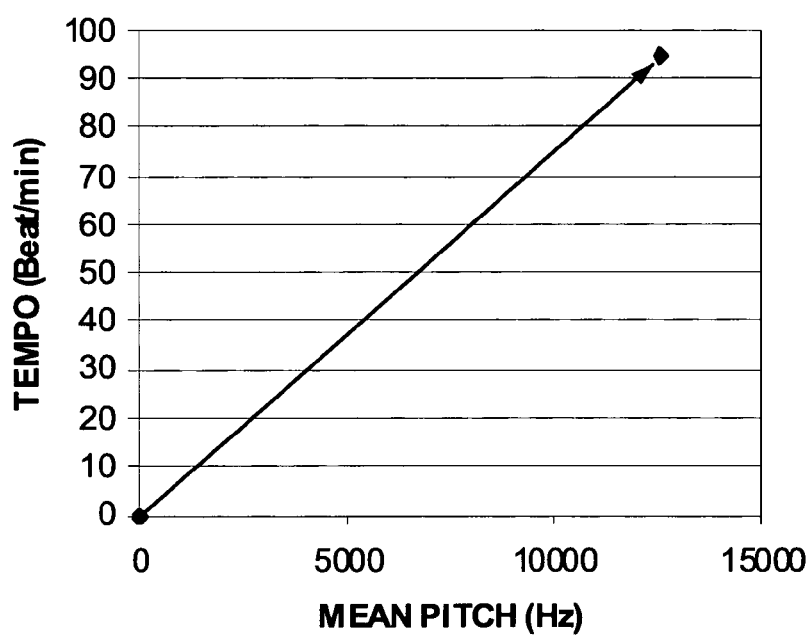
FIG. 1 is a diagram illustrating the concept of a feature vector.

Certain generalities relating to apparatus and methods for machine-updating of prototypes according to the present invention will now be described, followed by a discussion of examples of particular applications of the prototype-updating apparatus and methods.

In general, in the digital domain a prototype (or instance) of a digital object or digital content can be described, objectively, in terms of "features", each feature consisting of:

data identifying a measurable, non-subjective attribute of this object/content, and a number quantifying the value of this attribute for the object/content in question.

Thus, an individual feature can be expressed as follows: <attribute(value)>.

The particular attributes that are meaningful for a given application depend on the nature of the digital objects/content being handled. For example, in the case of an application involving music, relevant attributes may include, for example: the pitch of a musical note, the mean pitch of a melody, the tempo of a piece of music, the musical key in which a melody is played, the variance of a melody object, the repetitivity of a melody, etc. As another example, in the case of an application involving control of robotic apparatus, relevant attributes may include, for example: the orientation of a robotic body part (e.g. in terms of azimuth and elevation), the speed of movement of the robot relative to a surface, the degree of magnification of a robotic imaging sensor, the force exerted by a robotic actuator, the degree of extension of a piston in an actuator, etc. In a yet further example, in the case of an application involving design of a curve, relevant attributes may include, for example: x and y co-ordinates of a start position, x and y coordinates of an end position, the number positions where the curve crosses itself, etc. Numerous other examples will readily occur to the person skilled in the art and new applications are liable to come into existence. Accordingly, it is to be understood that the above list is far from exhaustive.

Typically, prototype-updating apparatuses used in embodiments of the present invention have access to feature data describing a collection of prototypes (digital objects/content). The collection of prototypes may correspond to a repository of existing digital objects/content—for instance, a database of music files—or it may be a notional collection of all the prototypes which can be created by a generative device—for instance a melody generator. As is well-known, regardless of the form taken by the collection of objects/content, it is easier for the apparatus to develop meaningful tag models, and to provide the user with appropriate update of a prototype, if the number of objects/content items in the collection is large (in particular if it is large relative to the number of dimensions of the feature space).

The entire set of all possible prototypes (digital objects/content) in a given application can be termed the "combinatorial domain" for this application. In general, embodiments of prototype-updating apparatus and methods of the present invention can determine feature vectors for all of the prototypes in their combinatorial domain.

Any given object/item of content in the collection is liable to be described by a set of several features and so can be described using a "feature vector". Each dimension of the feature vector corresponds to an attribute of a different feature of this object/content and the magnitude of each component of the vector corresponds to the value of the associated attribute in respect of this object/item of content. So, to take a very simple example, if a digital object (in this example, a sound) is described by the following two features:

Feature 1: <mean pitch(12,600 Hz)>
Feature 2: <tempo(95 beats per minute)> then the feature vector for this object could be represented as illustrated in FIG. 1. (In general, prototypes are liable to be described using feature vectors having more than two dimensions, but the number of applicable attributes will depend on the application).

As explained above, the feature vector for a given digital object/item of content describes quantifiable non-subjective properties of that object/content (or, to be more precise, non-subjective properties of the object/content when rendered in a form perceptible to the user). However, the invention enables a user to use arbitrary terminology—including subjective descriptors—to indicate which property of a prototype the user wishes to update.

Accordingly, embodiments of the present invention make use of a tagging system which allows the user to associate descriptive tags (notably words or expressions) to a given digital object or item of digital content. The tagging system includes a tag-inputting section (including a user interface), to input user-assigned tags and record the association of these tags to the corresponding tagged digital objects/item of contents. The tagging system also makes use of a machine learning system which analyses the user-assigned tags, and the features (attributes/values) of the tagged digital objects/items of content, in order to determine a mapping between feature vectors and tags.

Various supervised classification techniques are already known for developing tag models in respect of a collection of digital objects/content that has been annotated using user-assigned tags. In general, a supervised classification scheme uses a supervised learning algorithm in order to build a mapping between, on the one hand, non-subjective technical features extracted from the digital objects/items of content (prototypes) and, on the other hand, the tags. This approach makes use of data for a set of prototypes which have known features (attributes and their values) and have already been tagged, for example by the user. This is known as the "training set".

Once the training set has been obtained, this can be used to train a classifier such as a Support Vector Machine (SVM), a neural network, decision trees, or other convenient devices, using a supervised learning algorithm. In particular, when developing a tag model for a tag T, the training set contains "positive" and "negative" examples, that is, prototypes which conform to tag T (notably, prototypes to which the user has assigned tag 7) and prototypes which do not conform to tag T The classifier is trained by presenting it with the feature vector of each prototype in the training set, together with an indication as to whether this prototype is a positive or negative example for tag T The classifier adapts (for example, in the case of a neural network classifier, the weights applied by the various nodes in the network are gradually altered) so as to embody a mapping between feature vectors and a classification of a prototype into positive or negative examples of T This mapping is the tag model for tag T When a new prototype, i.e. one which is not a member of the training set, is classified using the trained classifier embodying tag model T, the classifier will output a value which indicates the probability that this prototype is well-described by the tag T Thus, the output of the trained classifier indicates the descriptive power of this tag in relation to the new prototype. Many trained classifiers are normalized so that their output is in the range of 0.00 to 1.00, and decision trees are generally set so that their output is either "1" or "0", but the skilled person will readily understand how other output ranges can be accommodated.

The accuracy of a classifier that has been trained using a supervised learning algorithm depends on many factors, the most important of which being the number and quality of the examples in the training set. Usually, tag models will be generated using data on all of the prototypes which the user has tagged to date. Thus, the greater the number of tags the user assigns, and the greater the number of prototypes that are tagged, the better the classifier will be.

The training set is generally prepared by finding positive and negative examples, then removing a certain number of examples (positive or negative, as required) in order to produce a training set which contains approximately the same number of positive and negative examples.

Many different techniques are known for identifying the examples for use in the training set. The choice of positive examples is usually straightforward: for example, the positive examples may be all of the prototypes to which the user has assigned the tag under consideration. However, other approaches are possible for choosing the positive examples.

The choice of negative examples is an important part of the establishment of the training set and is not trivial: just because a prototype has not been assigned the tag T by a user does not mean that tag T is entirely non-descriptive of this prototype.

Any suitable approach may be used for the selection of negative examples for the training set, including, but not limited to, the following:

choose prototypes which have not been assigned tag T, choose prototypes that already have some tags (in order to avoid choosing unidentified prototypes) and these tags do not include tag T, choose prototypes whose "tag set" is as different as possible from the tag sets of the prototypes to which the user has assigned tag T, obtain "negative tagging" of prototypes by the user: that is, arrange for the user to indicate traits that a prototype does not possess (for instance, to indicate that a prototype is "not red", "not shaded", etc.) as well as to specify traits which the prototype does possess, etc.

The use of supervised classification algorithms in machine learning systems is well-known and so no further detail will be included here.

Figure 2:
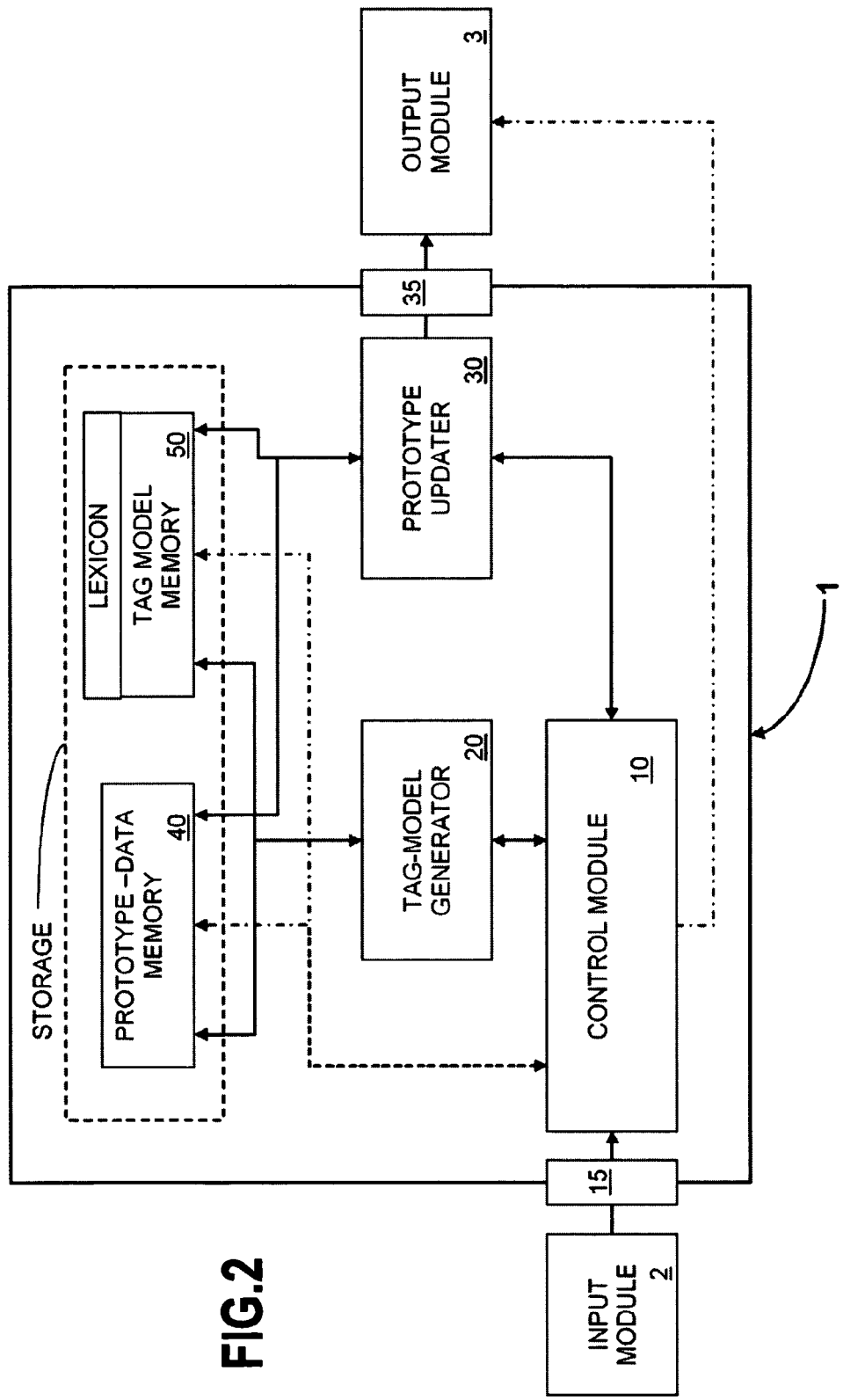
FIG. 2 is a block diagram showing certain major components of a prototype-updating apparatus according to one embodiment of the invention.

Now that some of the general principles used in embodiments of the present invention have been described, a description will be given of the general structure and operation of a prototype-updating apparatus according to one embodiment of the invention. FIG. 2 illustrates this general structure by way of a block diagram.

It is to be understood that, in practice, the prototype-updating apparatus 1 will usually be implemented using a suitably-programmed general-purpose computer (or application-specific data-processing equipment); the different elements shown in FIG. 2 are identified merely to aid understanding of the various functions that are performed by the prototype-updating apparatus. Moreover, the distribution of functions between the various elements shown in FIG. 2 could be changed and/or these functions could be performed using a lesser or greater number of elements than that shown in FIG. 2.

Furthermore, when implemented in practice the prototype-updating apparatus 1 may include various elements which are not represented in detail in FIG. 2 (e.g. conventional memories storing application programs, image-processing components associated with display elements, etc). It is to be understood that the prototype-updating apparatus 1 of FIG. 2 can incorporate or cooperate with the usual conventional modules that are required for implementation in the chosen application/context.

As can be seen from FIG. 2, the prototype-updating apparatus 1 according to the present invention receives user input from an input module 2, via an input interface 15, and presents output to the user on an output module 3 via an output interface 35. Typically, but not exclusively, the input module 2 may consist of or include a keyboard, a mouse or other pointing device, a light pen, a touch screen, a microphone, etc. The output module 3 may, and often will, incorporate a display (for example a display screen, printed output, etc.) for presenting a prototype to the user visually. However, the invention is not particularly limited with respect to the means used for presenting prototypes to the user. For example, in the case of a music-creation system, prototype sounds, melodies, etc. will typically be output to the user in audible form as well as via display of a visual representation of the waveform (such that the output module 3 includes a loudspeaker or headphone device as well as a display device). In another example, in the case of a system for controlling a robotic device, prototype commands for controlling action by the robotic device may actually be output to the robotic device itself (in other words, in this case the output module includes the robotic device).

Often the input module 2 will form part of a single computer apparatus which also includes the prototype-updating apparatus 1 and the output module 3. However, this does not have to be the case: for example, the input and output modules 2, 3 may be provided in a user terminal and the prototype-updating apparatus 1 may be located in a server remote from the user terminal.

The prototype-updating apparatus 1 of the FIG. 2 embodiment includes a tag-model generator 20 and a prototype updater 30 which operate under the control of a control module 10. Typically, the prototype-updating apparatus 1 will include data storage elements such as the prototype-data memory 40 and the tag model memory 50 shown in FIG. 2. In suitable cases, a generative device (e.g. an object generator) may be provided instead of or in association with the prototype-data memory 40.

The control module 10 is arranged to receive input from a user, via the input module 2. The control module 10 is arranged to determine whether user input at a given moment represents a message tagging a prototype or a command for updating of a prototype. This determination can be made in various ways. Typically, the user will interact with the protocol-updating apparatus 1 via a graphical user interface and the interface item operated by the user (e.g. by selecting from an on-screen menu item, clicking on an icon, etc.) will indicate whether his input relates to tagging a prototype or updating a prototype.

In apparatus and methods according to the present invention the user is free to use any expression he chooses as a descriptor for tagging prototypes (or as a descriptor for indicating the type of prototype-update he wishes to obtain). Thus, he could use descriptive expressions taken from one or more languages, made-up words, sequences of symbols, or any expression he chooses. Furthermore, the tags need not be in the form of word-type expressions, they may take substantially any form that is meaningful to the user: for example, the tags could be sounds, gestures (captured via a sensor), colours (selected from a palette), a drawing, etc.

Moreover the user could input the tags in any desired fashion including typing on a keyboard, selecting symbols using a pointing device, speaking into a microphone, etc.

The prototype-updating apparatus according to the invention does not determine the semantic meaning of a tag from the structure or content thereof, rather it infers the objective significance of the tag, in terms of feature vector parameters, by reference to the tag models.

In systems according to the invention, a user command for prototype update will identify one or more tags and operators which, in combination, indicate the variation that the user wishes to obtain in a prototype. The identity of the prototype-to-be-updated may be specified explicitly in the prototype-update command, or in a separate command, or it may be inferred, for example from the context in which the user issues the update command.

The tag data in the prototype-update command uses the user's own lexicon to indicate which property or properties of the prototype the user wishes to update. The operator data in the command indicates conditions that should be satisfied by the specified tags of the updated prototype, notably conditions applicable to the descriptive power of the specified tag(s) in respect of the updated prototype. Often these conditions will set the desired descriptive power of a tag of the updated prototype relative to the actual descriptive power of the same tag in relation to the prototype-to-be-updated (e.g. "more curved", for a prototype of a physical object). However, the present invention is not limited to that case. The update command may set the descriptive power of one tag of the updated prototype relative to the descriptive power of one or more other tags of the updated prototype, or relative to the descriptive power of one or more tags of the updated prototype and the prototype-to-be-updated.

In certain applications the update command can quantify an amount of change that the user wishes to achieve in the descriptive power of a specified tag. The amount of change can be quantified in any convenient manner. For example, the amount of change may be specified in percentage terms "20% more red", "10% less repetitive", etc. However, other approaches are possible for quantifying the desired magnitude of the change. Furthermore, the user may wish to update a prototype in a manner such that one particular tag no longer applies (this amounts to setting the descriptive power of the specified tag to 0), or so that it reaches a maximum (which amounts to setting the descriptive power to 1).

The present invention is not particularly limited having regard to the format/syntax of the update command.

The control module 10 is arranged to determine which prototype is concerned by a given user input, i.e. which prototype is to be tagged/updated, either by decoding user-issued commands or by inference. Often (but not exclusively), the prototype to be tagged/updated will be one which is being presented to the user (by display, playback, etc) at the time when he inputs his tagging message or update command to the control module 10.

As indicated above, the complete set of prototypes which may be processed by a given embodiment of the prototype-updating apparatus according to the invention can be constituted in different ways: notably, it can be a set of digital objects/items of content stored in a database, a set of digital objects/items of content produced by an object generator device, or a combination of the two. Whether or not a given prototype has yet been tagged by the user, it will have a feature vector associated with it, related to its attributes and values taken by those attributes. Typically, the feature data is available to the prototype-updating apparatus 1 because it has been supplied as meta-data along with the digital object/item of content in a database, or the feature data forms part of the output generated by the object generator which produces the prototypes. However, if need be, the prototype-updating apparatus 1 may include a feature extractor which analyses the prototypes in order to determine values for the attributes thereof.

Data relating to the feature vectors of the various prototypes may be stored in a prototype-data memory 40. The prototype-data memory 40 may, if desired, store digital object data or items of digital content (songs, movie clips, etc.) as well as feature vector data for these items. In some cases storage of the feature vector data amounts to storage of the prototype itself (in other words, the prototype can be presented to the user by outputting the feature vector data to the output module 3).

The functioning of the prototype-updating apparatus 1 of FIG. 2 will now be described. When the control module 10 determines that a user input is a tagging message, assigning one or more descriptors to a prototype, the control module 10 identifies the prototype being tagged and records in the prototype memory 40 the descriptors (tags) that the user has assigned to the specified prototype. If any of the tags are new, i.e. this is the first time the user has used this tag to label a prototype, then the tag is added to a lexicon used by the prototype-updating apparatus 1. Typically, the lexicon will be stored in memory in association with tag models for each expression in the lexicon.

In some applications the control module 10 is arranged so that, when it determines that a user input is a tagging message, it instructs the tag-model generator 20 to update the tag models of any tags that were already defined in the lexicon and to develop a new tag model for any new tags. In other applications, the updating (or establishment) of tag models may await triggering (e.g. by user action, by the acquisition of a certain number of tagged items, etc.).

The tag model generator 20 generates a new tag model (or an updated tag model) using machine learning techniques, for example those which have already been described above. In the case of a new tag, the training set will only include one positive example, notably the prototype which the user is currently tagging. In the case of a tag which is already in the lexicon, the tag model generator 20 consults the existing tag model stored in the tag model memory 50 and updates the model by adding to the training set the prototype to which the user's tagging message relates.

If the feature space that has been defined for the system has a large number of dimensions, the accuracy of the tag model may well be relatively low until the user has used the associated tag for a good number of times. However, if desired, the prototype-updating apparatus 1 may be provided with a preliminary routine to prompt the user to tag a predetermined number of prototypes when beginning use of the apparatus. For example, the apparatus 1 may cause a set of prototypes to be presented to the user and prompt the user to input tags applicable to those prototypes. If a prompted-tagging session of this kind is implemented then the choice of prototypes for use in the session can influence the accuracy of the tag models that will be developed. In particular, it can be advantageous to include prototypes which have feature vectors that are dissimilar from one another.

Moreover, in many applications, before a user seeks to use his personal lexicon in order to command the update of a prototype, he will already have built up a collection of tagged prototypes without specific prompting.

In some applications the system could be bootstrapped by exploiting tags that have already been assigned to digital objects/content by other users (perhaps in a collaborative tagging environment). If desired, the user could be given the opportunity to confirm or replace tags that have been assigned by other users.

As explained above, when a tag model is applied to the feature vector of a prototype, it acts as a classifier which produces a value indicating the degree to which this tag is an appropriate description of the prototype. Thus, the value produced by the tag model in respect of a given prototype can be considered to be a number quantifying the descriptive power of this tag in respect of the given prototype.

When the control module 10 determines that a user input is a prototype-update command, the control module 10 identifies the prototype to be updated and instructs the prototype-updater 30 to output a suitable updated prototype. In particular, the control module 10 forwards to the prototype updater 30:
  data identifying the prototype to be updated,
  the tag(s) specified in the update, and
  the conditions to be satisfied by the descriptive power of the specified tag(s) after the update.

The prototype-updater 30 seeks prototypes which could be presented to the user in response to his prototype-update command. The prototype updater 30 can be configured in a variety of different ways in order to achieve the function of identifying suitable candidate prototypes.

The prototype-updater 30 is adapted to keep the updated prototype fairly similar to the prototype it replaces. It could be considered that the updated prototype is a "variant" of the previous prototype, changed in the particulars indicated in the update command. Different approaches are possible for locating a prototype which could be considered both to be: a variant of the pre-update prototype (i.e. fairly "globally similar" to it), and to be changed in accordance with the update command. One approach consists in first identifying prototypes whose tags satisfy the condition(s) specified in the prototype-update command and then identifying which of these prototypes is "globally similar" to the prototype-to-be-updated. Another approach consists in first identifying prototypes that are globally similar to the prototype-to-be-updated and then determining which of these prototypes has tags that satisfy the condition(s) defined by the prototype-update command. An example of the latter approach will now be described.

In certain embodiments of the invention, the prototype-updater 30 generates or identifies a set of prototypes which could be considered to be variants of the prototype-to-be-updated. These variants can be generated via a variation generator (notably, in the case where the prototypes are generated by an object generator), or identified in a collection of existing digital objects/items of content (by evaluating the difference between the prototype-to-be-updated and the prototypes in the collection).

In a case where variants are generated by an object generator, the object generator typically generates each variant by making a small variation in the parameters that were used to generate the protocol-to-be-updated.

In a case where variants are located within a collection of prototypes, a variety of known methods can be used for deciding whether or not two prototypes are "globally similar". One simple approach consists in defining a "distance" function quantifying the degree of difference between two prototypes by reference to their feature vectors. A simple distance is the Euclidean distance (which simply computes the norm of the difference between the feature vectors of the two prototypes). Depending on the nature of the prototypes under consideration, more complex or "natural" distances could be used instead, without changing the structure of the rest of the prototype-updater 30.

The present invention is not particularly limited with regard to the technique that is used for evaluating whether or not a candidate prototype is "globally similar" to the prototype-to-be-updated. As indicated above, the degree of similarity may be assessed by analysing the feature vectors of the prototypes, but other approaches will readily occur to the skilled person. For example, the similarity between the prototypes may be assessed by comparing the tag sets assigned of the two prototypes, by comparing a combination of the prototype features and the assigned tag sets, etc.

When the prototype-updater 30 has identified a suitable number of variants of the initial prototype—and the apparatus may be arranged, if desired, to allow the user to set the value of this "suitable number"—it may be arranged to sort the variants into order, based on increasing "distance" from the initial prototype.

The prototype updater 30 calculates the allowed range(s) of values for the tag-descriptive-power parameter(s) of the updated prototype (based on the tags and operators in the update command). The prototype updater 30 then accesses tag model memory 50 to retrieve the tag models) applicable to the tag(s) specified in the update command and applies this tag model (these tag models) to the feature vectors of the prototypes in the sorted collection.

In some cases it is necessary for the prototype-updater 30 to determine what is the value of the descriptive power of a given tag with respect to the protocol-to-be-updated, before determining the permissible value for the descriptive power of this tag with respect to the updated prototype. This may be achieved, in some cases, by reading out data in the prototype-data memory 40, or in other ways (e.g. applying the tag model for the given tag to the feature vector of the prototype-to-be-updated).

For example, if the prototype-update command specifies that a prototype image A should be made "more dotty", and the tag model for tag "dotty" yields a value of 0.6 for the "dottiness" of the prototype image A, then the prototype-updater 30 will determine that suitable candidates for the updated prototype need to have "dottiness" greater than 0.6 (when assessed by applying their feature vectors to the tag model). In a case where the update command indicates the magnitude of the desired change—for example, "a third more dotty"—then the prototype-updater 30 will set the range of allowed values accordingly (e.g. to 0.8 or above).

The prototype-update command may specify merely a direction of change that a user wishes to see in the descriptive power of a tag, not the magnitude of the desired change. Even in such a case, the prototype-updater 30 may still be arranged, if desired, to set the range of allowable values for the descriptive power parameter a certain percentage away from the value applicable to the prototype-to-be-updated (e.g. 10% away). This helps to ensure that the user will discern a change as the result of the update.

In order to determine whether or not a given prototype has tags which meet the conditions set in a prototype-update command, the prototype-updater 30 needs to consult the tag model(s) for the specified tag or tags in order to quantify the descriptive power of this tag (these tags) in respect of the prototype under consideration. The prototype-updater 30 accesses the tag model memory 50 in order to retrieve the tag model(s) applicable to the tag(s) specified in the prototype-update command, then uses the retrieved tag model(s) to classify a large number of prototypes (by applying the tag model(s) to the feature vectors of these prototypes). The result of this process is a list of prototypes and associated values for the descriptive power(s) of the tag(s) in respect of these prototypes. The prototype-updater 30 determines which of the evaluated prototypes is associated with allowable values for the tag descriptive powers and identifies these prototypes as candidates to be the updated prototype.

Typically, the tag model(s) for the tag(s) specified in the prototype-update command will be applied to the prototypes iteratively, starting with the first-listed variant (the prototype most similar to the initial prototype) and onwards towards the last variant in the list (the least similar prototype). For each prototype, each tag model classification yields a number indicating the probability that this tag applies to this prototype (i.e. indicating the descriptive power of this tag in relation to the prototype in question). For each candidate prototype, the tag descriptive power value (or values) is checked for compliance with the condition(s) specified in the prototype-update command.

As soon as the prototype updater 30 finds a prototype which yields descriptive power value(s) that satisfy the condition(s) specified in the prototype-update command, it may stop classifying the variants and output the identified prototype to output module 3, for presentation to the user. This approach limits the processing time necessary for classifying the variants and favours the updating of a prototype using a replacement which is as similar a possible to the initial prototype. However, other approaches are possible, for example, classifying all of the variants that are within a certain distance of the pre-update prototype and then selecting, from among the candidate prototypes whose tags satisfy the conditions in the user's prototype-update command, one which has been presented to the user the least (or greatest) number of times.

It is possible that, in some cases, the prototype-updater 30 may fail to locate a candidate prototype which satisfies the user's prototype-update instruction. The prototype-updater 30 may be arranged to implement one or more different strategies in this eventuality. For example, the prototype-updater 30 may be arranged to expand its search, automatically, so as to include a larger number of candidate prototypes than usual and/or so as to evaluate candidate prototypes which have a lower-than-usual degree of similarity to the pre-update prototype. The expansion of the search could lead the prototype-updater 30 to increase the number of databases and/or generative devices that it uses as sources of candidate prototypes. Thus, for example, the prototype-updater 30 may be arranged such that, if it 30 finds no suitable candidate prototype in a first database or generative device (e.g. one local to itself) it will then automatically access one or more additional generative devices and/or databases (e.g. ones remote from it but accessible via a communications network or the like).

Alternatively, in the event of a failure to locate a suitable updated prototype, the prototype-updater 30 may be arranged so as to indicate to the user that his instruction could not be followed. The system may be arranged to allow the user to respond by modifying the configuration of the prototype updater 30—for example by changing the number of prototypes considered by the prototype-updater 30 and/or the degree of similarity that is required between the pre-update and post-update prototypes, by specifying a new database or generative device to consult, etc.—and then repeating his command.

It should be mentioned that prototype-updating apparatus according to the present invention is not limited to using only the tags defined by a user. In suitable applications, the apparatus may also take into account tags (meta-data) that have been assigned to prototypes by a third party (or automatically). This meta-data can be used, for example, in the evaluation of which prototypes are "similar" to the prototype-to-be updated. This meta-data may include items which are not directly descriptive of the perceptual properties of the tagged prototype: for example, editorial-type data such as the title, date of publication, artist/author, etc.

Now that some of the general principles used in embodiments of the present invention have been described, a description will be given of one detailed example of how the invention may be applied. It should be noted that the detailed example described below is but one approach for implementing the invention in the selected context; other implementations, having different technical details, exist within the same context. Moreover, it will be understood that the full range of applications of the invention is vast. A small selection of other example applications of the invention follows the detailed example application.

In the description below it is presumed that the prototype-updating apparatus of each example has components as illustrated in FIG. 2. However, the skilled person will readily understand that this assumption is made solely for the purposes of simplifying the explanation: alternative components could be used.

Example Application 1—Updating Colours

The first example that will be described here of an application of the present invention relates to a computer-aided design tool that a user can employ to design/select a colour. Accordingly, this tool may be designated a colour creation tool. The prototypes in this application are colours and a user seeks to arrive at a colour which pleases him (for example, as a prototype of paint for use in decorating his home, as a colour to use in image data to be displayed on a screen, etc.).

In this particular computer-aided design tool, the input module 2 is typically implemented using a keyboard and mouse and the output module 3 usually consists of a display screen (which displays the prototype colours, as well as various command elements and data, using a graphical user interface).

In this context it is convenient to use a colour generator for producing the prototypes and updated prototypes, rather than to store data representative of all the possible colours. The features of the prototypes can be expressed, conveniently, in terms of the RGB model of colours, notably by having attributes <red>, <green> and <blue>, with each of these attributes taking a value in the range of 0 to 255. An arbitrary colour can be built by selecting values for these R, G and B attributes. In this example, tag models are produced by analysis of the three-dimensional (R, G, B) feature vectors. It will be understood that the features of the prototype colours could be defined in terms of other models of colours (YUV, CMYK, RGBA, etc.).

Figure 3:
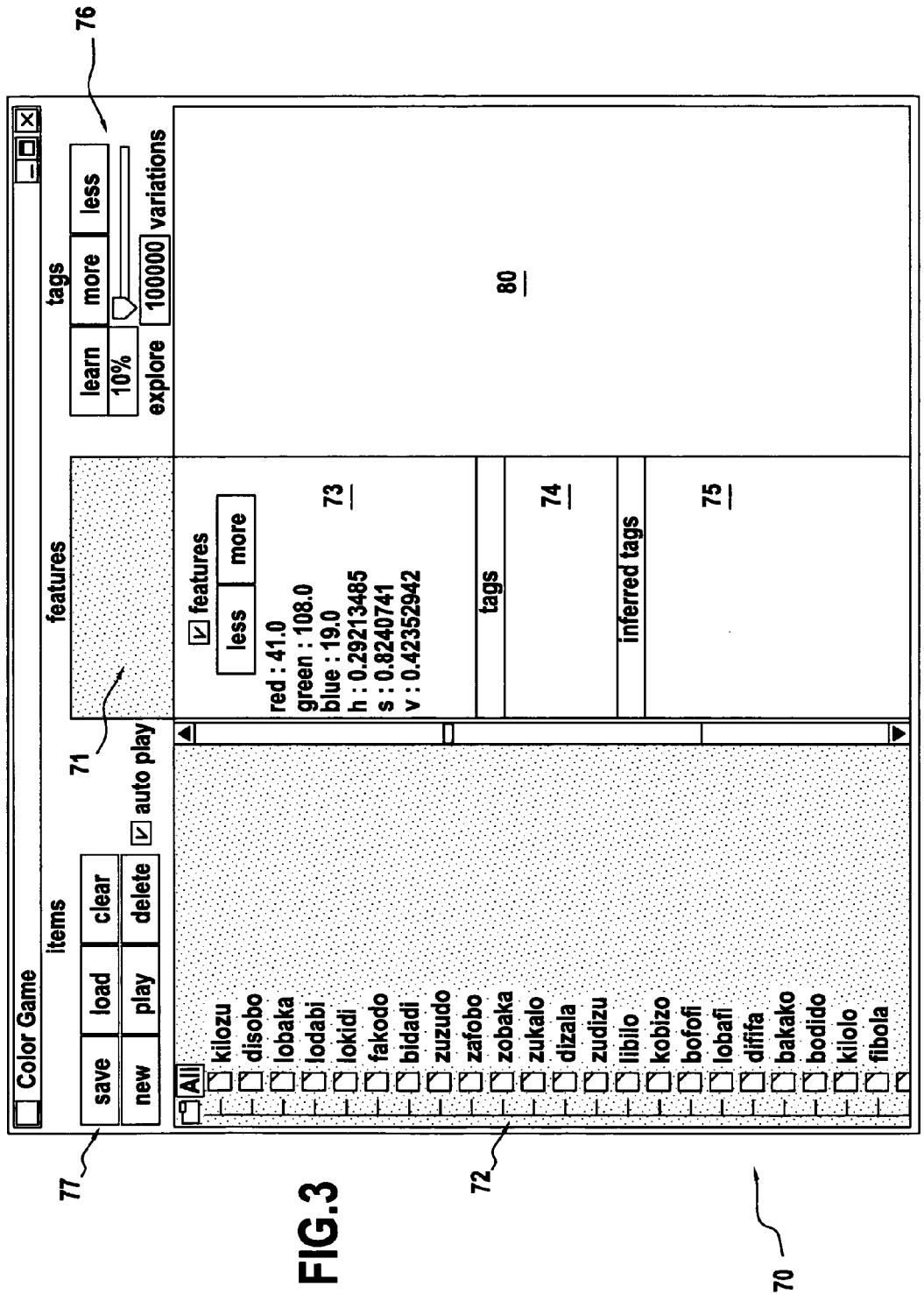
FIGS. 3 to 8 illustrate examples of screen images that may be displayed on a screen during use of a colour creation tool embodying the invention.
Figure 4:
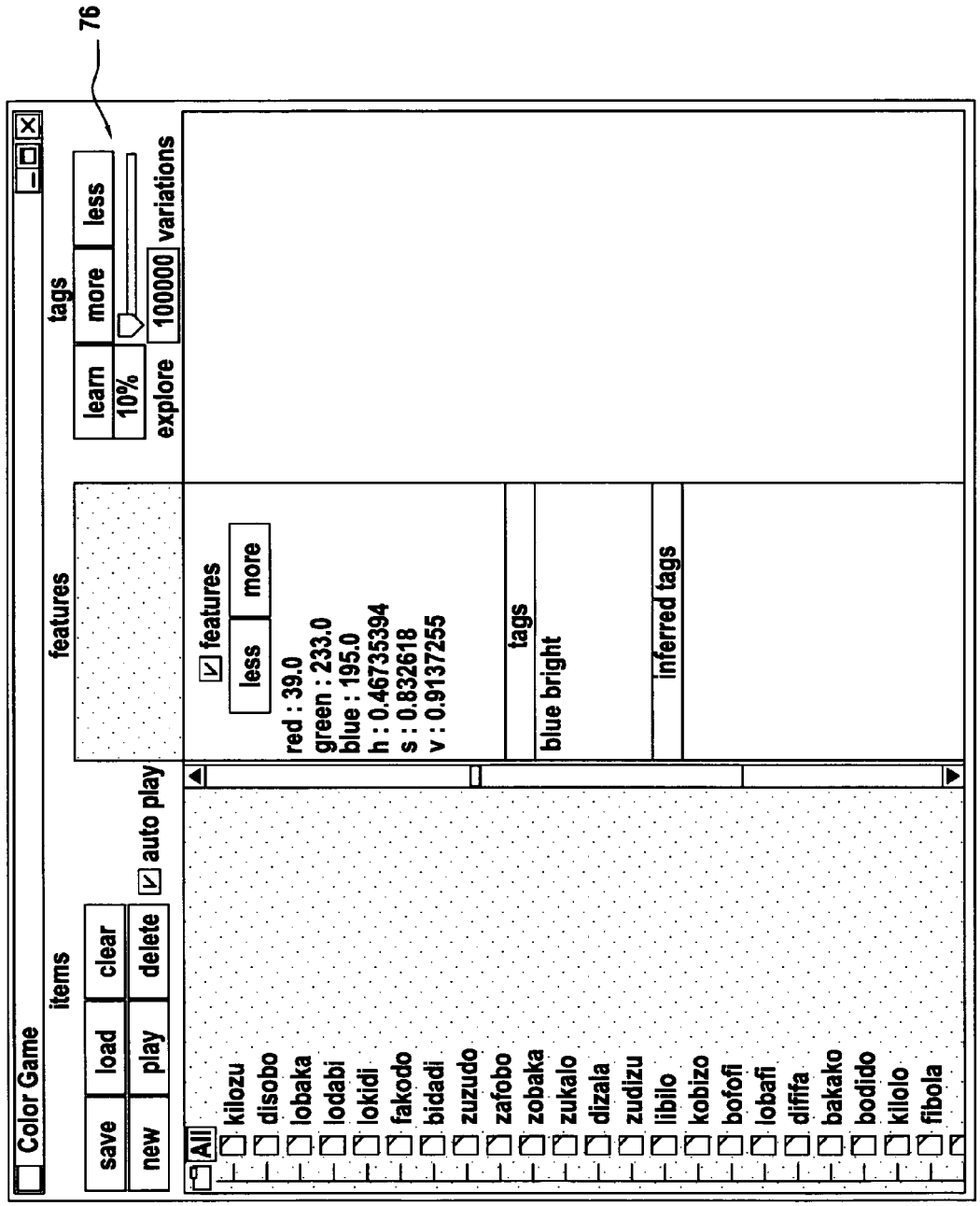

The functioning of the colour creation tool will be described with reference to FIGS. 3 to 8 (which are grey-scale renderings of colour screen displays). FIGS. 3 and 4 illustrate examples of design frames which may be displayed during use of the colour creation tool. FIGS. 5 to 8 show a succession of frames that may be displayed on the screen during one example of a colour-creation operation.

As illustrated in FIG. 3, the colour creation system is adapted to display a design frame 70 which has seven main regions of interest: a "current-prototype" region 71 for displaying a patch of a colour corresponding to the current prototype, prototype-data region 72 for displaying the names assigned to the prototype colours, feature-data region 73 for displaying a list of the attributes and associated values for the current prototype, assigned-tag region 74 for displaying the tags assigned to the current prototype by the user, inferred-tag region 75 for displaying the tag descriptive-power values which the apparatus has determined, using the tag models, as being applicable to the current prototype, an update-instruction region 76 for operation by the user in order to control the prototype updating, and a prototype-management region 77 for operation by the user to control management (e.g. saving, loading, deleting, etc.) of prototype data.

Incidentally, even in the case where the user assigns particular tags to a particular prototype colour, the colour creation tool applies its tag models in order to determine inferred values for the tags of this colour (and will display the inferred tag values in inferred-tag region 75). If the tag model is well-constituted then the inferred tag value it will produce for a given tag that the user has assigned to a prototype will be very close to 1.0.

In this example, when a user begins to use the colour creation tool, he activates the "new" button in the prototype-management region 77 a number of times and, on each activation of the "new" button, the object generator generates a new prototype. That is, for each prototype, the apparatus randomly chooses values, in the range 0 to 255, for each of the attributes R, G and B. The apparatus also creates names for each of these randomly-generated prototypes. The prototype data is arranged in a directory structure, as illustrated by the arrangement of prototype names in the prototype-data region 72. If the user positions a cursor over one of the prototype names in the prototype-data region 72, and operates a selection device (e.g. clicks a mouse button) then this prototype becomes the "current prototype". As an alternative to the user causing generation of new prototypes, the system may be programmed to create a certain number of prototypes, automatically, on star-up of the colour creation tool. The number of initial prototypes of this sort may be controllable via user input.

In the prototype-data region 72 each of the prototype names may be displayed in a colour corresponding to the colour of the associated prototype. This makes it easier for the user to select a prototype which corresponds to a colour of interest to him. Also, the background colour displayed in the prototype-data region 72 at a given time may be set to correspond to the colour of the current prototype at that time (i.e. to be the same as the colour displayed in current prototype region 71).

When the user selects a new "current prototype" by selecting a name from the list in this way, a patch of colour of the colour corresponding to this prototype is displayed in the current prototype region 71 and the features of the prototype are listed in the feature-data region 73. If any tags have been assigned to this prototype by the user, or inferred by the colour creation tool, then the names of the relevant tags are displayed in the assigned-tag region 74 or the inferred-tag region 75, respectively. Incidentally, the data displayed in regions 73 and 75 is provided for the user's information only; the user cannot manipulate this data. However, in this example, the user can assign tags to the current prototype by activating the assigned-tag region 74 then inputting the desired tags (e.g. by typing in words using a keyboard). Alternatively, the user can activate the names of one or more prototypes in the list in region 72 then, by entry of tags into region 74, input in one go tags that are common to all of these prototypes.

On start-up of the colour creation tool, the user will tend to select and tag a number of initial prototypes. As the user assigns tags to the prototypes, a tag model generator internal to the tool will produce tag models (as described above). Alternatively, the establishment (or updating) of tag models may await some triggering action, such as user activation of the "learn" button in region 76.

Let us suppose, in the present example, that the user tags certain prototype colours using the following tags "red", "blue", "dark" and "bright".

FIG. 4 illustrates the tagging process. In the example illustrated in FIG. 4, the user has selected a prototype named "lokidi" and has tagged this prototype with the expressions "blue" and "bright". It should be mentioned that the colour creation tool is not arranged to detect that the user tag "blue" is related to the RGB attribute B.

According to this example, when the user wishes to design a colour, he will typically select a starting prototype (by clicking a name in the prototype-data region 72), inspect the appearance of this prototype in the current prototype region 71, and decide on some aspect of the prototype that he would like to change. The prototype-updating process involved during the design process will be described with reference to FIGS. 5 to 8.

Figure 5:
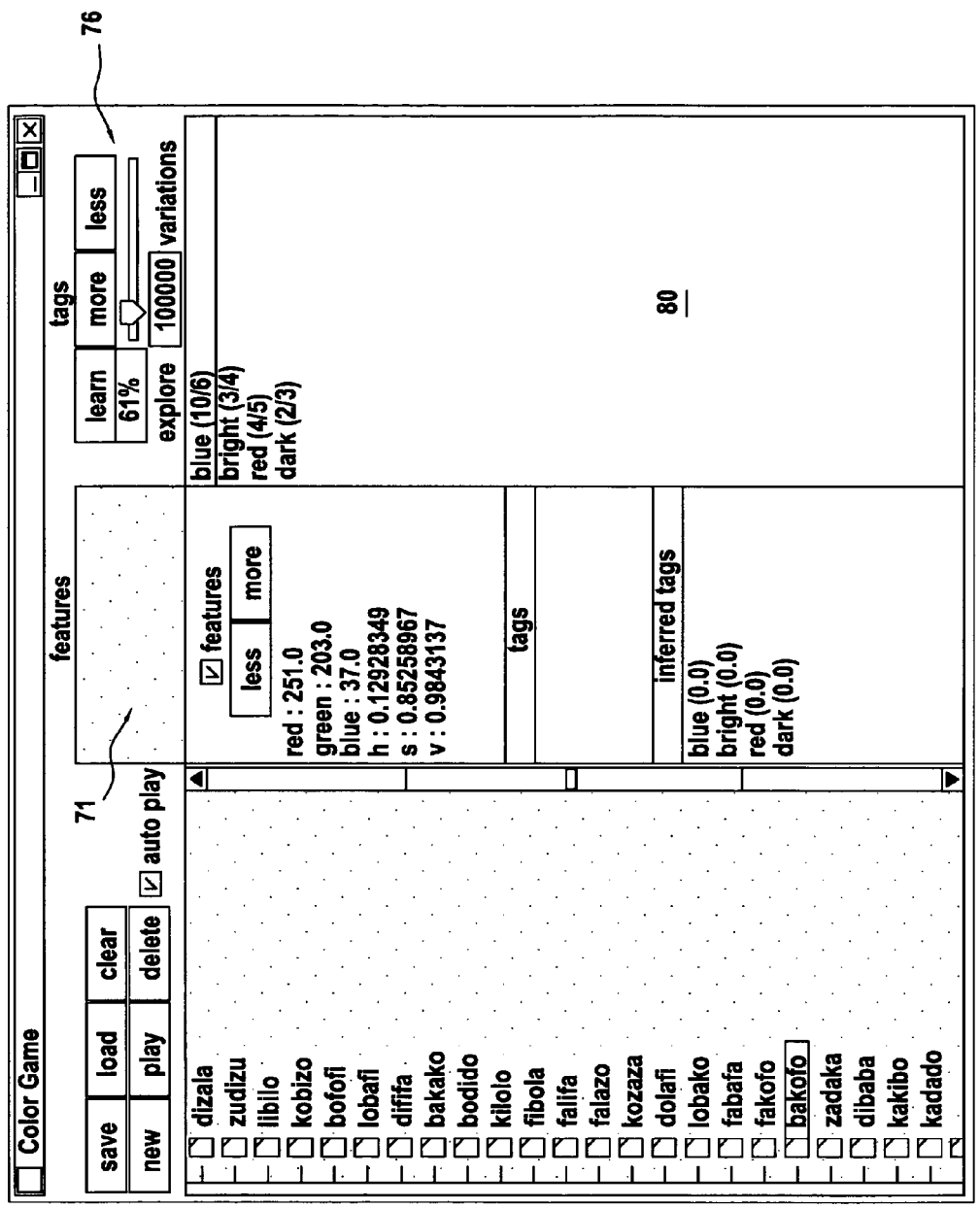

FIG. 5 illustrates the case where the user has selected the prototype "bakofo" as the initial prototype. In this example, this prototype corresponds to a yellow colour. Furthermore, it will be noted that the colour creation tool does not have a tag for the term yellow.

The colour creation tool has four tags in its lexicon at this time. In this example, the user is allowed to update prototypes with reference to any of the available tags in the lexicon. Accordingly, these four tags are displayed in a portion 80 of the update-instruction region 76. The bracketed numbers associated with the four tags indicate the number of positive and negative examples, respectively, that have been used to establish the tag model for this tag (in its current form). Thus, for example, at the time of display of the screen image shown in FIG. 5, the tag model for the tag "blue" has been established using only 10 positive examples and 6 negative examples.

As illustrated in FIG. 5, the user selects the tag "blue" as the tag with reference to which the prototype will be updated. Then the user activates a virtual button labelled "more" in the update-instruction region 76 in order to instruct the updating of the prototype "bakofo" by making it "more blue". (The user could have activated a button labelled "less" in the update-instruction region 76 in order to indicate that the prototype should be updated to be "less blue"). A virtual slider in the update-instruction region 76 is set at 10% and, accordingly, the prototype updater seeks candidate prototypes which are at least 10% "more blue" than "bakofo". (The user can set this slider to any value he desires).

Although the apparatus does not understand the semantic meaning of the tag "blue", the prototype updater applies the tag model which has been developed for the tag "blue" to the feature vectors of the prototypes in order to find prototypes which produce a descriptive power value which is at least 10% greater than that applicable to the "bakofo" prototype.

More particularly, the colour generator produces a large number of variant prototypes (based on the current "bakofo" prototype but with variations $\delta R$, $\delta G$, $\delta B$ relative to the "bakofo" prototype's values for the RGB attributes), and the prototype updater applies the tag model which has been developed for the tag "blue", iteratively, to the variants (as described above) in order to find one which conforms to the user's instruction. Incidentally, the number of variants produced by the colour generator for evaluation can be set by the user by entry in a window in the update instruction region 76. In the sample screen illustrated in FIG. 5 the number of variants to consider/explore is set to 100,000.

Figure 6:
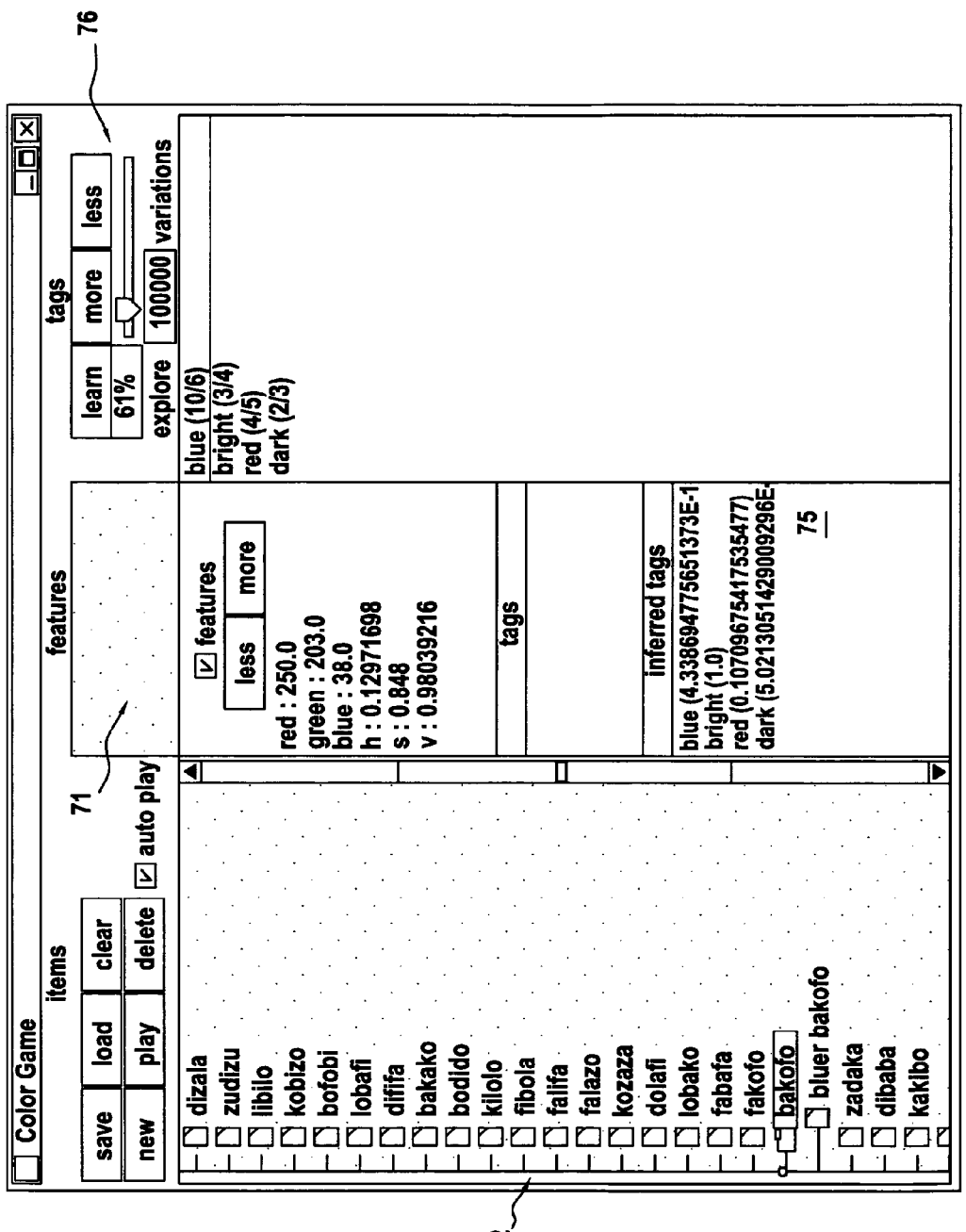

The prototype updater 30 of the colour creation tool selects as the updated prototype a variant which it labels "bluer bakofo", and displays a patch of the new colour in the current prototype region 71. FIG. 6 illustrates the situation after the update, where "bluer bakofo" has become the "current prototype". It will be seen that the list of prototypes in the prototype-data region 72 has been updated to show the new prototype "bluer bakofo" in a directory labelled "bakofo". This helps the user to keep track of the derivation of prototypes as he moves through the design process. Also, the apparatus has inferred values for the probabilities that the various tags in the lexicon apply to the "bluer bakofo" prototype—see region 75 in FIG. 6.

Figure 7:
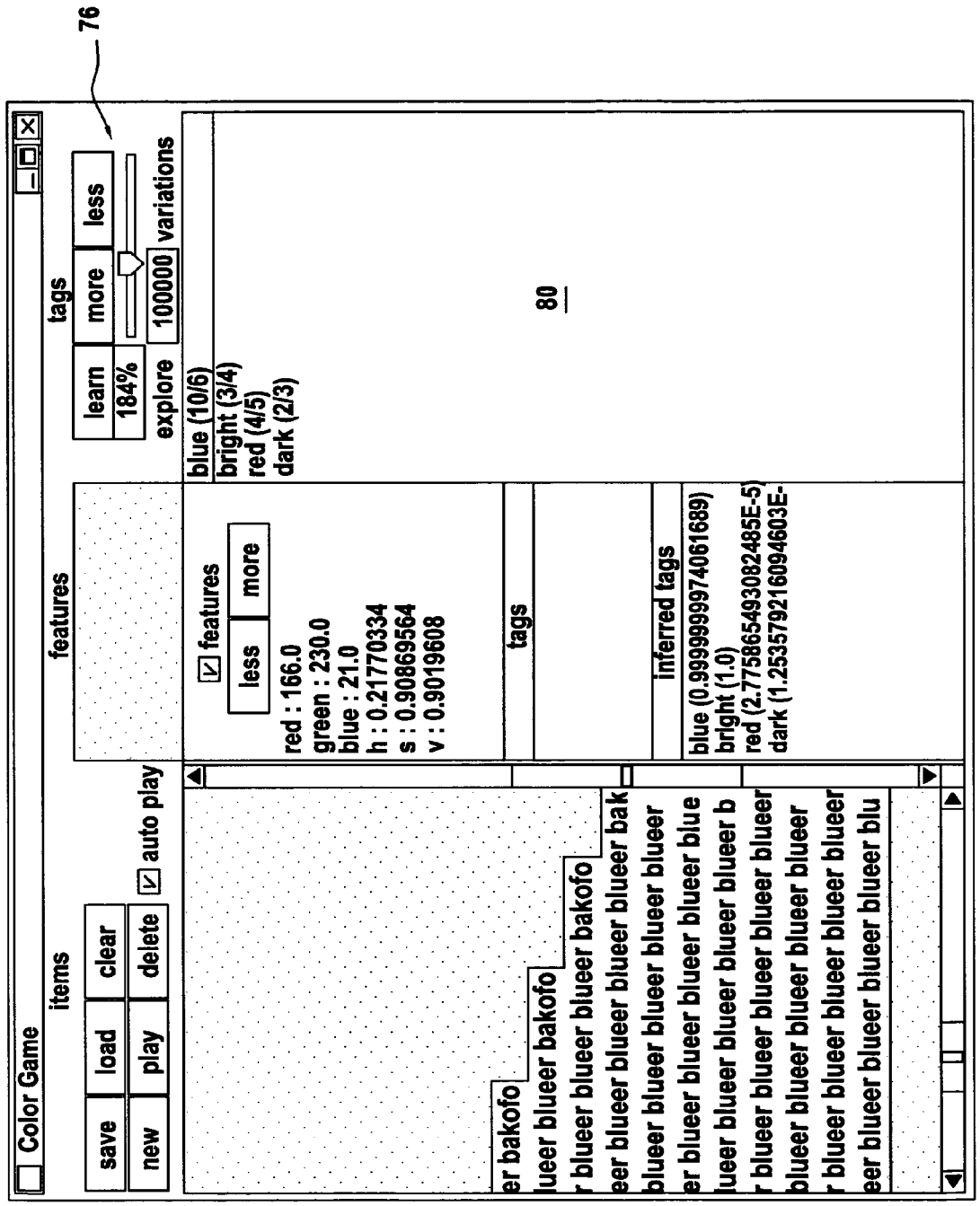

Let us presume that the user wishes to make the prototype colour bluer than "bluer bakofo" (which, in this example, still looks very yellow). Once again, he activates the tag "blue" and clicks on the virtual "more" button in the update instruction region 76. The "bluer bakofo" prototype is updated to a variant labelled "bluer bluer bakofo". When the process is repeated a number of additional times, the user ends up with an updated prototype as illustrated in FIG. 7. This updated prototype has a green colour. In other words, the colour creation tool has, indeed, made the initial prototype "more blue" in accordance with the user's instructions in a number of updating steps, even though the user's instructions made use of tags whose semantic meaning was not directly known by the apparatus. Moreover, the colour creation tool has implemented a prototype update which conformed to the user's instruction expressed in terms of subjective descriptors, even though the tag model for the tag specified in the update command was established using only 16 examples.

Figure 8:
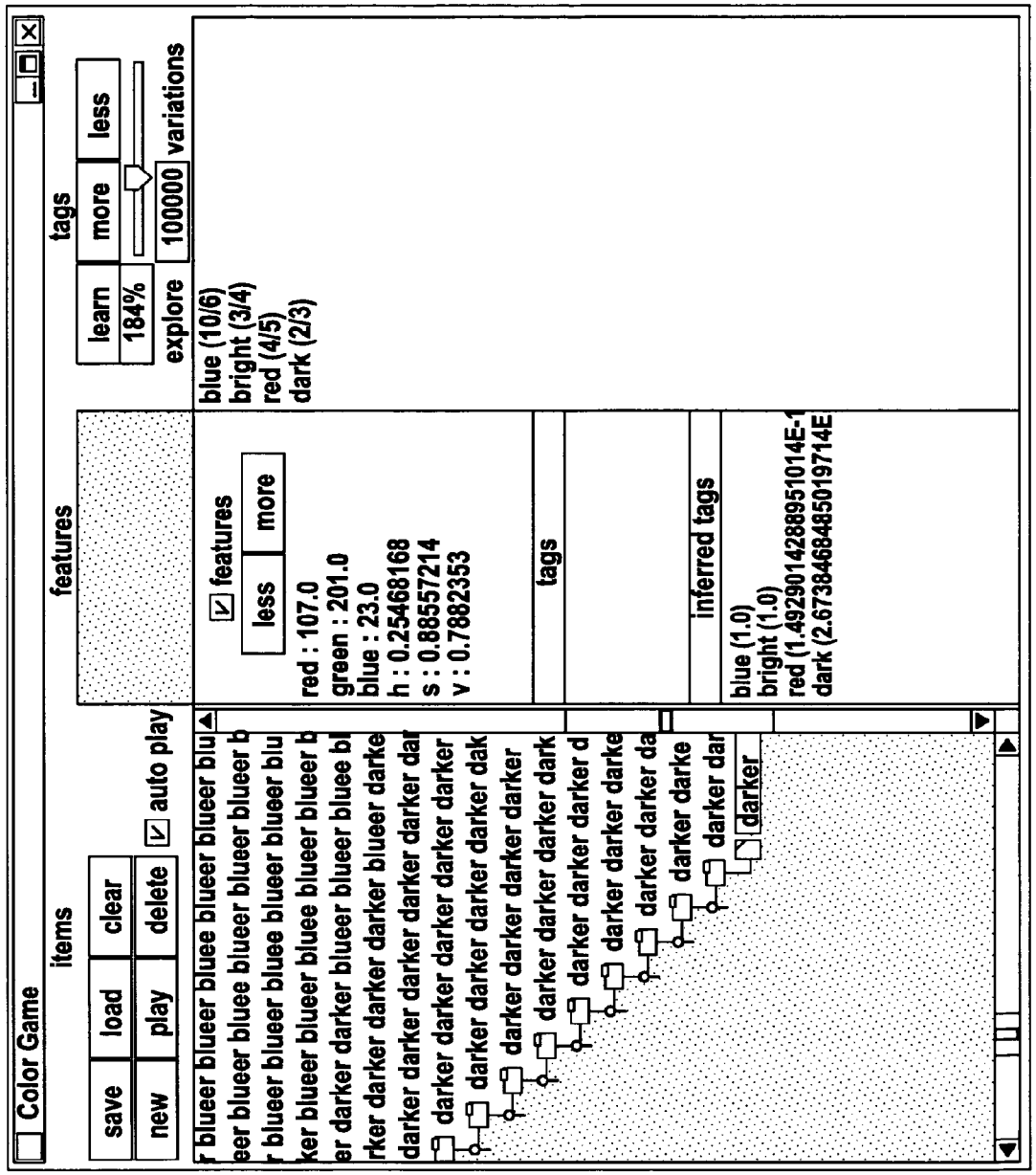

Suppose that, now, the user wishes to obtain a darker colour than that of the prototype displayed in FIG. 7. He can instruct this update by simply selecting the tag "dark" in the region 80 of the screen and activating the virtual button labelled "more" in the update instruction region 76. FIG. 8 illustrates the final prototype obtained after a number of "more dark" instructions have been processed. It will be noted that the name of this final prototype is "darker darker darker darker , , , bluer bluer bluer . . . bakofo", indicating the chain of updates that have produced this prototype from the original "bakofo".

It will be seen from a comparison of FIG. 8 with FIG. 7 that, once again, the colour creation tool has implemented a prototype update—"more dark"—which conformed to the user's instruction expressed in terms of subjective descriptors, even though the tag model for the tag "dark" was established using only 5 examples. The skilled person will readily understand that this success derives, in part, from the small size of the feature space in this case (only three features: R, G and B).

Incidentally, the particular naming convention used for updated prototypes in the above example is but one of several which could be used. For example, when the colour creation tool is configured so that the graphical user interface displays indications in a language other than English then the naming convention used for updated prototypes reflects the current GUI language—e.g. In French, "bluer bakofo" could be labelled "plus bleu bakofo", "bakofo(plus bleu)" or any equivalent.

A Selection of Other Example Applications

Audio Sound Synthesis:

The invention can be applied, advantageously, in hardware- or software-based audio sound synthesizers. An audio sound synthesizer according to the present invention typically incorporates a sound synthesis module which produces (using hardware or software) an audio sound that constitutes the "prototype" which the user may wish to modify. In other words, the prototypes are generated in this instance using an object generator. However, it would be possible to store audio data on prototype sounds in a prototype-data memory such as memory 40 illustrated in FIG. 2, and to read out the audio data for the various prototypes, as desired.

The audio sound synthesizer according to the invention has an interface enabling the user to input prototype-update commands that are expressed in terms of his own subjective descriptors (tags), and to input tagging messages to tag sounds which are played to him (e.g. via a loudspeaker). The synthesizer incorporates a tag model generator adapted to produce tag models embodying the relationships which exist between the non-subjective attributes of the synthesizable sounds and the descriptive tags that have been assigned to tagged sounds, and a prototype-updater adapted to find an updated prototype sound which matches a user's instruction (notably, which is globally similar to the pre-update prototype but incorporates a modification in accordance with the user's command).

Often, audio sound synthesizers describe audio sounds using complex non-subjective features whose meaning is not intuitively obvious to a user. By enabling the user to express his desired modifications of a prototype audio sound using tags that are meaningful to him, an audio sound synthesizer according to the present invention allows a user to manipulate the synthesized sound without requiring expert knowledge of the underlying non-subjective attributes of the sound.

Digital Content Management

The invention can be applied, advantageously, in digital-content management systems, for example application software which allows a user to access or browse digital content (video clips, songs, image files, etc.) in a collection and to manage the collection (e.g. by adding or deleting items of content; altering the arrangement of the content—in terms of playlists, directory structures, etc.; to rent out items of content; to reproduce items of content, etc.).

A digital-content management system according to the present invention typically incorporates (or has access to) a database which stores data representative of the various items of content in the collection—these items of content constitute the "prototypes" which the user may wish to update, notably by replacing one item of content from the collection by another. The present invention enables the user to update his choice of an item of content without needing to provide an explicit description of the properties of the new selection. Instead, the user indicates his choice in a dual manner: on the one hand, by specifying one or more conditions that should apply to the tags of the new item of content and, on the other hand, by indicating that he desires a prototype-update, in other words the new item of content should be globally similar to the pre-update item of content.

The digital-content management system according to the invention typically has a graphical user interface enabling the user to input the prototype-update commands that are expressed in terms of his own subjective descriptors (tags), and to input tagging messages to tag items of content in the collection that are presented to him. Usually the prototypes are presented to the user by rendering then in a manner appropriate to the nature of the item of content: e.g. "displaying" images, "playing back" audio files using a loudspeaker, "displaying" video clips, etc.

The digital-content management system incorporates a tag model generator adapted to produce tag models embodying the relationships which exist between the non-subjective attributes of the items of content and the descriptive tags that have been assigned to tagged items, and a prototype-updater adapted to find an updated prototype item of content which matches a user's instruction (notably, which is globally similar to the pre-update prototype but incorporates a modification in accordance with the user's command).

Database query software already exists in which an item of content can be retrieved in response to a user query that specifies desired values for subjective tags that the user assigns to items in the database (e.g. search in an image database for images which have been tagged using descriptors "red" and "urban"). However, in the known software the tags are used in a descriptive sense, not as tools for modifying some property of an initial prototype. By way of contrast, a content-management system according to the present invention enables a user to employ his own subjective tags not only to locate content but also as a means of manipulating the properties of the content.

Although the present invention has been described above with reference to certain specific embodiments and applications thereof, the skilled person will readily recognize that the present invention is not limited by the particularities and details of the above-described embodiments and applications. More particularly, it is to be understood that various modifications can be made in the above-described embodiment, and different embodiments can be produced, without departing from the scope of the present invention as defined in the accompanying claims. In a similar way, the present invention can be employed in numerous applications different from the specific examples given above, without departing from the scope of the invention as defined in the claims.

For example, in an application where the prototypes correspond to digital objects/items of content stored in a database, this database can, if desired, be located remotely from the prototype-updating apparatus. In such a case, the prototype-updating apparatus will typically access the database via a communications network.

Furthermore, in certain applications it may be appropriate for an embodiment of prototype-update apparatus according to the invention to use both a generative device and a database to constitute its combinatorial domain (i.e. the full set of all possible prototypes).

Moreover, the distribution of functions between the various modules of the prototype-updating apparatus can be different from that described above with reference to FIG. 2. For example, rather than the control module 10 being the module which registers (in the prototype memory 40) the descriptors (tags) that the user has assigned to the specified prototype, this function could be performed by the tag model generator 20 or by a dedicated module.

The invention claimed is:

1. A prototype-updating apparatus comprising:
a microprocessor configured to implement:
a prototype-issuing unit configured to supply prototype digital objects or prototype items of digital content, each of said prototypes having one or more quantifiable attributes;
an output unit configured to output prototypes supplied by the prototype-issuing unit, for presentation to a user;
a user-input unit configured to receive input from a user and to discriminate prototype-update commands input by the user;
a tag input unit configured to register an association between respective prototypes and descriptive tags assigned to said prototypes;
a tag model generator configured to develop models of the relationships between the tags assigned to a prototype and prototype attributes, the tag model generator comprising an analysis unit configured to analyze the values of attributes of a plurality of tagged prototypes and the tags assigned to said prototypes;
a prototype-update-command processing unit configured to identify the prototype-to-be-updated and to identify update data in a prototype-update-command received via the user input unit, wherein the update data identifies a set of one or more specified tags and defines a degree to which the specified tags describe the updated prototype for output in response to the prototype-update-command;
a prototype-update unit configured to select, from among candidate prototypes supplied by the prototype-issuing unit, the updated prototype for output in response to the prototype-update-command, the prototype-update unit further comprising:
a similarity-assessment unit configured to assess the degree of global similarity between the prototype-to-be-updated and respective candidate prototypes,
a prototype-classifier configured, for each of the tags specified in the prototype-update command, to quantify the descriptive power of said specified tag for respective candidate prototypes, said classifier being configured to quantify said descriptive power by applying the tag model developed for the specified tag by the tag model generator, and
a condition-checking unit configured to assess candidate prototypes to determine, based on the descriptive power values quantified by the prototype-classifier, whether the tags specified in the update data describe the candidate prototypes to the degree defined by the prototype-update command;

wherein the prototype-update unit is further configured to select, as the updated prototype, a prototype which the similarity-assessment unit has assessed to be globally similar to the prototype-to-be-updated and which the condition-checking unit has assessed as being described, to the degree defined by the prototype-update command, by the tags specified in the update data;
wherein, in response to reception of a prototype-update command, the output unit is further configured to output the candidate prototype selected by the prototype-update unit.

2. The prototype-updating apparatus according to claim 1, wherein the similarity-assessment unit is further configured to evaluate the degree of similarity between the prototype-to-be-updated and the candidate prototype(s) by comparing the attribute values and/or the sets of tags applicable to the prototype-to-be-updated and to the candidate prototypes.

3. The prototype-updating apparatus according to claim 1, wherein the prototype-update-command processing unit is further configured to identify, in a prototype-update-command received via the user input unit, update magnitude data quantifying, with respect to a specified tag, a degree of change in tag descriptive power that is desired in the update, and the prototype updating unit is further configured to seek candidate prototypes for which the descriptive power of the specified tag differs from the descriptive power thereof with respect to the prototype-to-be-updated by an amount equal to or greater than the degree of change indicated by the update magnitude data.

4. The prototype-updating apparatus according to claim 1, wherein the prototype-issuing unit comprises a unit for accessing prototypes stored in a database.

5. The prototype-updating apparatus according to claim 1, wherein the prototype-issuing unit comprises a prototype-generating device.

6. The prototype-updating apparatus according to claim 1, wherein the user-input unit is further configured to discriminate tagging messages input by the user; and
the tag input unit is further configured to identify, in a tagging message received via the user input unit, data assigning one or more user tags to a prototype-to-be-tagged, and to register the user tag(s) assigned to said prototype-to-be-tagged.

7. A prototype-updating method comprising:
supplying prototype digital objects or prototype items of digital content, each of said prototypes having one or more quantifiable attributes;
outputting prototypes supplied by prototype-issuing means, for presentation to a user;
registering descriptive tag(s) assigned to specified prototypes;
receiving input from a user and discriminating prototype-update commands input by the user;
developing models of the relationships between tags assigned to a prototype and the prototype attributes, the model-development step comprising analysis of the values of attributes of a plurality of tagged prototypes and the assigned tags thereof;
identifying the prototype to be updated;
identifying update data in a prototype-update-command input by the user, wherein the update data identifies a set of one or more specified tags and defines a degree to which the specified tags describe the updated prototype for output in response to the prototype-update-command;

selecting, from among the supplied prototypes, the updated prototype for output in response to the prototype-update-command, the selecting step further comprising:
  assessing the degree of global similarity between the prototype-to-be-updated and respective candidate prototypes,
  for each of the tags specified in the prototype-update command, quantifying the descriptive power of said specified tag for respective candidate prototypes by application of the tag model developed for the specified tag in the developing step,
  checking candidate prototypes to determine, based on the descriptive power values quantified in the quantifying step, whether the tags specified in the update data describe the candidate prototypes to the degree defined by the prototype-update command, and
  selecting as the updated prototype a prototype which is assessed, in the global-similarity-assessing step, to be globally similar to the prototype-to-be-updated and which is determined, in the checking step, to be described by the tags specified in the update data to the degree defined by the prototype-update-command; and
outputting, in response to reception of a prototype-update command, the candidate prototype selected in the selecting step.

8. The prototype-updating method according to claim 7, wherein the global-similarity-assessing step comprises comparing the attribute values and/or the sets of assigned tags applicable to the prototype-to-be-updated and to the candidate prototype(s).

9. The prototype-updating method according to claim 7, further comprising the step of
  identifying, in a prototype-update-command input by the user, update magnitude data quantifying, with respect to a specified tag, the degree of change in tag descriptive power that is desired in the update, wherein the seeking step further comprises seeking candidate prototypes for which the descriptive power of the specified tag differs from the descriptive power thereof in respect of the prototype-to-be-updated by an amount equal to or greater than the degree of change indicated by the update magnitude data.

10. The prototype-updating method according to claim 7, applied in computer-aided design.

11. The prototype-updating method according to claim 7, applied in management of digital content.

12. A non-transitory computer readable medium having stored therein instructions that when executed by a computer cause the computer to implement a prototype-updating method comprising:
  supplying prototype digital objects or prototype items of digital content, each of said prototypes having one or more quantifiable attributes;
  outputting prototypes supplied by prototype-issuing means, for presentation to a user;
  registering descriptive tag(s) assigned to specified prototypes;
  receiving input from a user and discriminating prototype-update commands input by the user;
  developing models of the relationships between tags assigned to a prototype and the prototype attributes, the model-development step comprising analysis of the values of attributes of a plurality of tagged prototypes and the assigned tags thereof;
  identifying the prototype to be updated;
  identifying update data in a prototype-update-command input by the user, wherein the update data identifies a set of one or more specified tags and defines a degree to which the specified tags describe the updated prototype for output in response to the prototype-update-command;
  selecting, from among the supplied prototypes, the updated prototype for output in response to the prototype-update-command, the selecting step further comprising:
    assessing the degree of global similarity between the prototype-to-be-updated and respective candidate prototypes,
    for each of the tags specified in the prototype-update command, quantifying the descriptive power of said specified tag for respective candidate prototypes by application of the tag model developed for the specified tag in the developing step,
    checking candidate prototypes to determine, based on the descriptive power values quantified in the quantifying step, whether the tags specified in the update data describe the candidate prototypes to the degree defined by the prototype-update command, and
    selecting as the updated prototype a prototype which is assessed, in the global-similarity-assessing step, to be globally similar to the prototype-to-be-updated and which is determined, in the checking step, to be described by the tags specified in the update data to the degree defined by the prototype-update-command; and
  outputting, in response to reception of a prototype-update command, the candidate prototype selected in the selecting step.

* * * * *